Jan. 8, 1924. 1,480,540

E. M. IVIE

SAFETY BRAKE

Filed June 20, 1922 4 Sheets-Sheet 1

Witnesses:
F. L. Fox,
H. Berman

Inventor
E. M. Ivie,
By Clarence A. O'Brien
Attorney

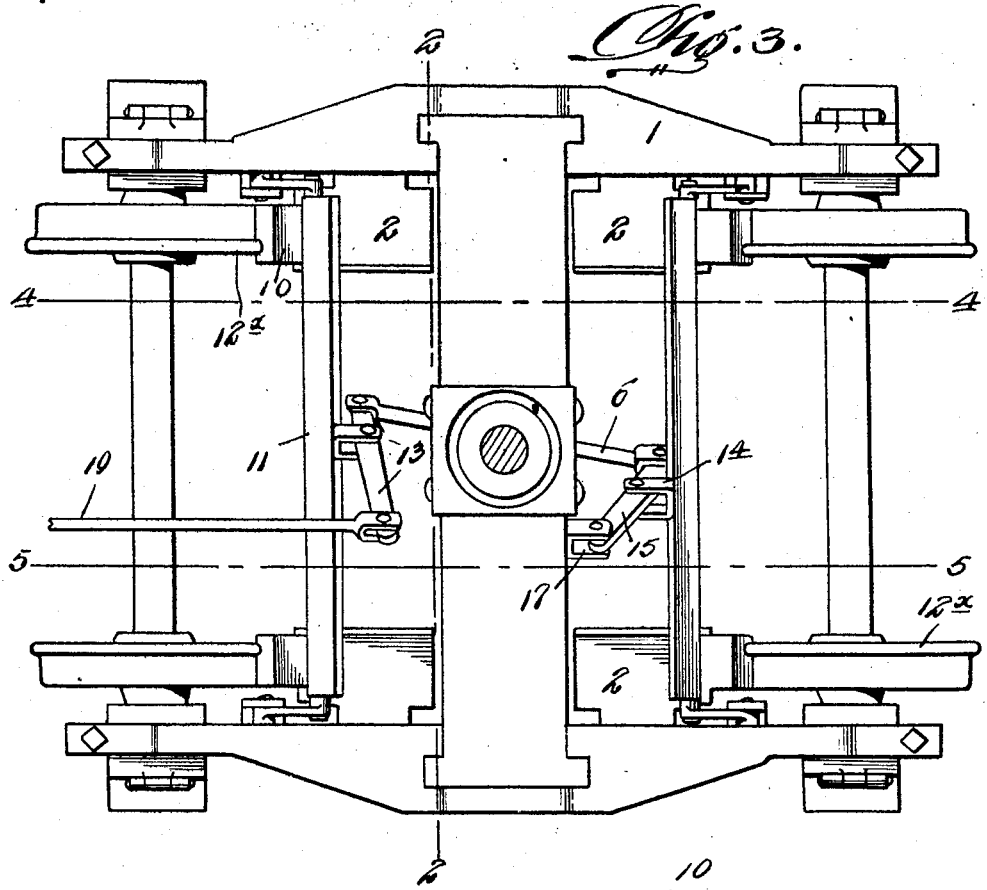
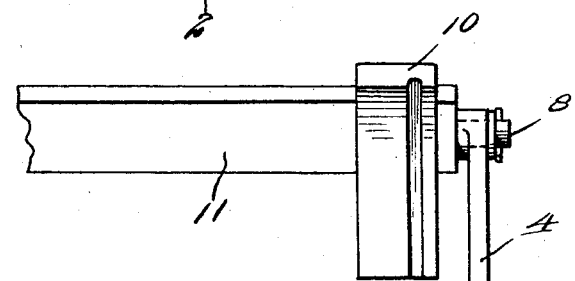

Jan. 8, 1924. 1,480,540
E. M. IVIE
SAFETY BRAKE
Filed June 20, 1922 4 Sheets-Sheet 3

Witnesses:
F. L. Fox,
H. Berman

Inventor
E. M. Ivie,
By Clarence A. O'Brien
Attorney

Jan. 8, 1924.  
E. M. IVIE  
1,480,540  
SAFETY BRAKE  
Filed June 20, 1922  
4 Sheets-Sheet 4

Witnesses:  
F. L. Fox  
H. T. Berman

Inventor,  
E. M. Ivie,  
By Clarence A. O'Brien  
ATTORNEY

Patented Jan. 8, 1924.

1,480,540

UNITED STATES PATENT OFFICE.

EMORY M. IVIE, OF ATLANTA, GEORGIA.

SAFETY BRAKE.

Application filed June 20, 1922. Serial No. 569,708.

*To all whom it may concern:*

Be it known that I, EMORY M. IVIE, a citizen of the United States, residing at Atlanta, in the county of Fulton and State of Georgia, have invented new and useful Improvements in Safety Brakes, of which the following is a specification.

One object of my said invention is the provision of a car brake designed more especially for use on the truck frame constituting the subject of my contemporary application, filed June 20th, 1922, Serial No. 569,708.

Another object of the invention is the provision of a car brake that is essentially safe in that provision is made to preclude any of its parts falling and bringing about derailment of a train.

Another object is the provision of a brake that will not run up on the wheels and cause the brakes to jerk when applied by hand, the shoes of my novel brake being opposed to the top quarter of the wheels.

Another object is the provision of a brake which will absolutely release in virtue of its being overbalanced and so disposed that the brake rigging is located above the sand bolster so that in case the car is derailed the bottom rod will not be engaged and impaired by an obstacle on the track or a cross-over rail.

Other objects and practical advantages of the invention will be fully understood from the following description and claim when the same are read in connection with the drawings, accompanying and forming part of this specification, in which:—

Figure 3 is a top plan view showing the improvement.

Figure 1:
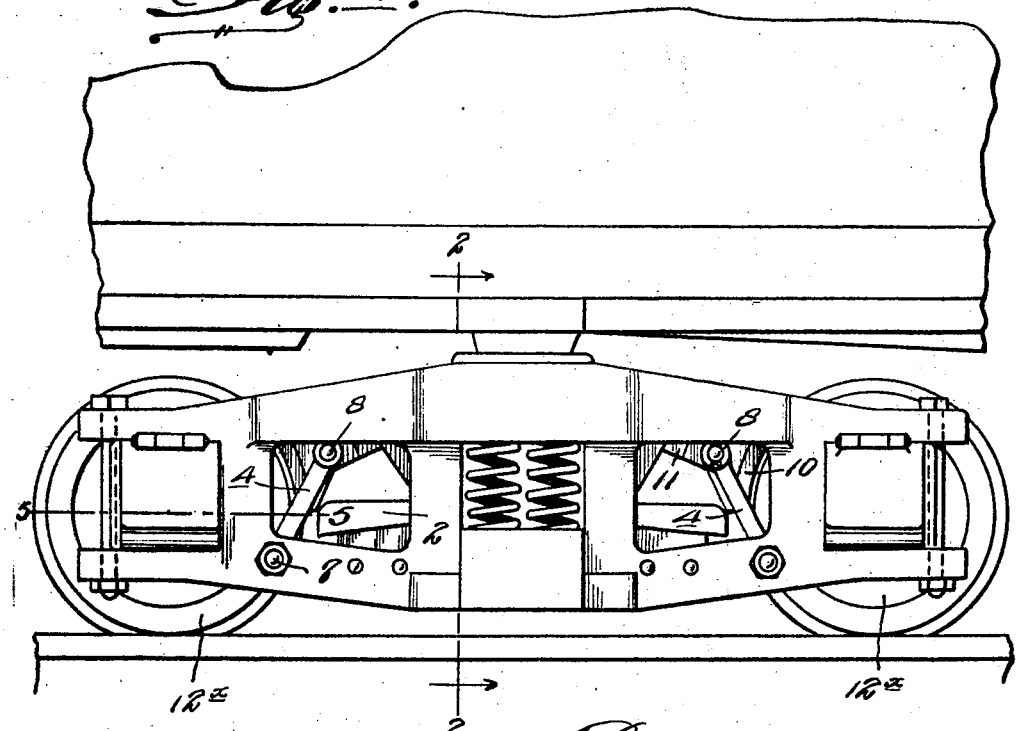
Figure 1 is a view showing in side elevation a truck frame equipped with the brake constituting the best practical embodiment of my invention of which I am aware.
Figure 2:
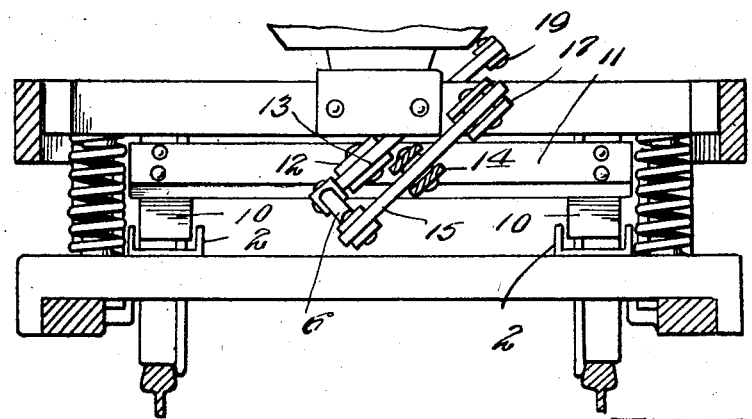
Figure 2 is a cross-section taken on the line 2—2 of Figure 1.
Figure 4:
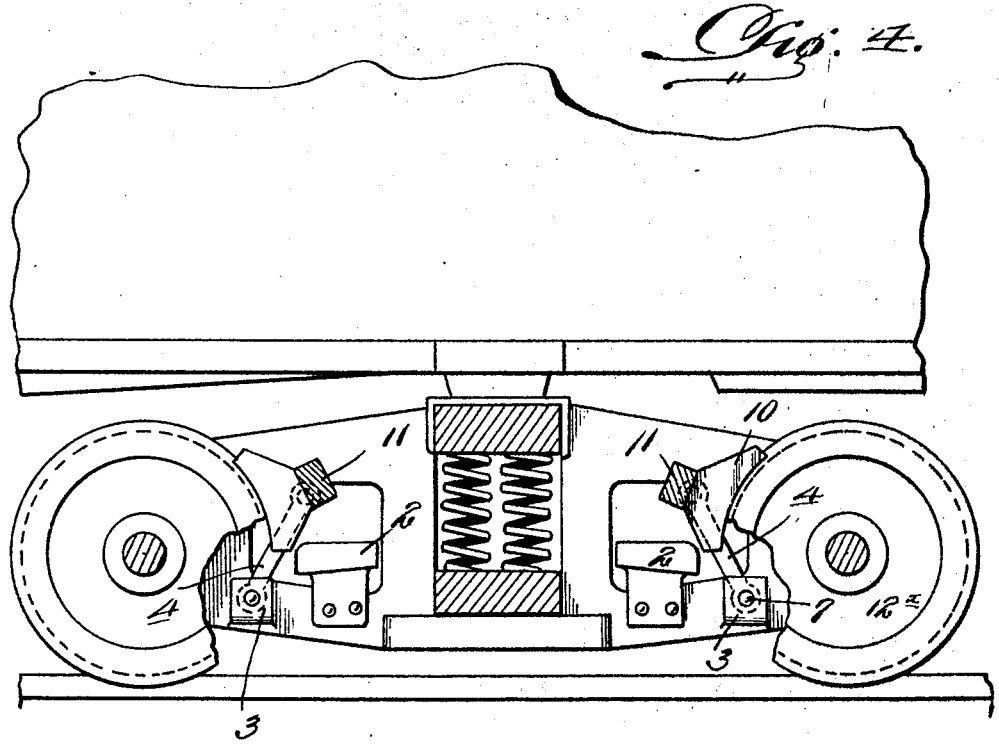
Figure 5:
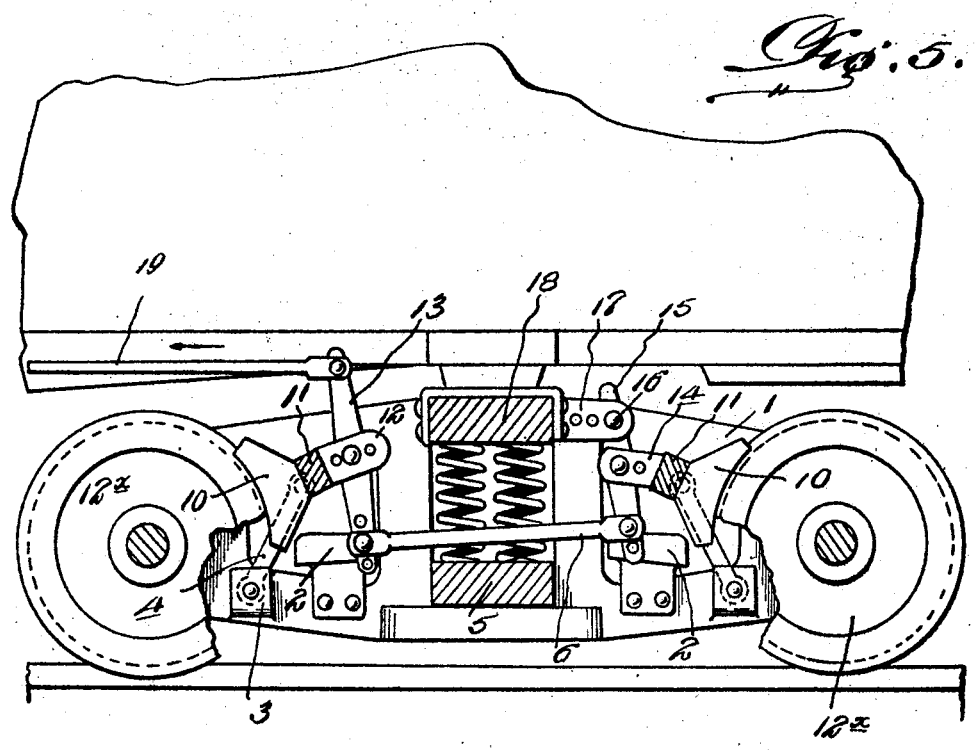

Figures 4 and 5 are longitudinal vertical sections taken in the planes indicated by the lines 4—4 and 5—5, respectively, of Figure 3.

Figure 6:
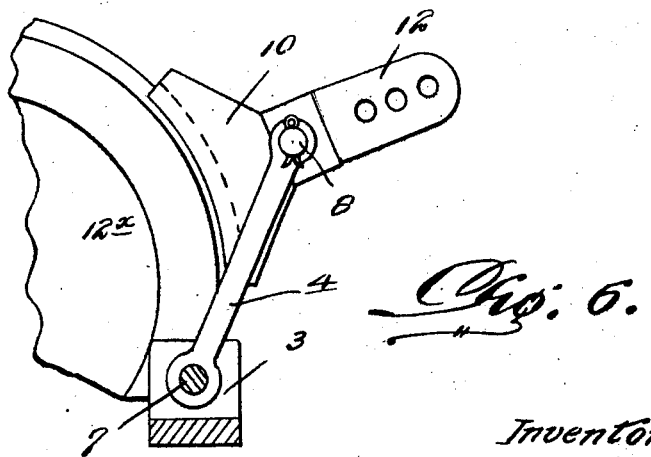

Figure 6 is a detail view showing the connections of one of the links adjacent to a brake shoe.

Figure 7:
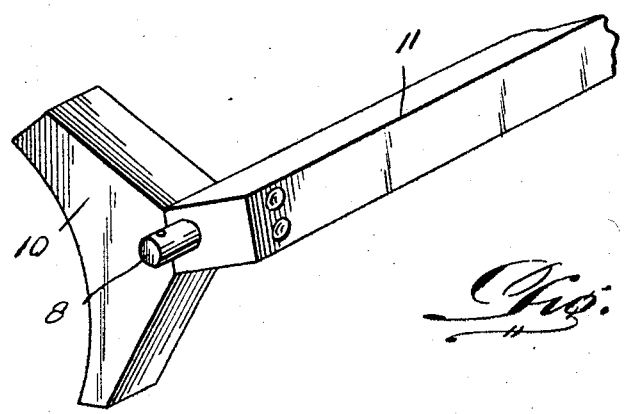

Figure 7 is a perspective of one end of a beam and the brake shoe thereon.

Figure 8 is a detail view taken at right angles to Figure 6 and showing the same construction.

Similar numerals of reference designate corresponding parts in all of the views of the drawings.

The truck frame illustrated is of the construction constituting the subject matter of my contemporary application of even date herewith, but I desire it understood that my novel brake can be employed on any other truck to which it is applicable. I would say, however, that in accordance with my present invention the side members 1 of the truck frame are provided at their inner sides with shelves 2, mounted on the side frames and designed and adapted to project under the brake heads or beams and the brake shoes and serving after the manner of cups to catch the brake beams and prevent the same from falling under the wheels and derailing the train. The side members 1 of the truck frame are also characterized by brake hanger brackets 3 which extend from the inner sides of the said side members so as to afford a top quarter brake and one which will absolutely release in virtue of its being overbalanced. In this connection it will be understood that the hangers 4 of the brake are hung upside-down so as to raise the brake rigging above the sand bolster designated by 5, this being advantageous inasmuch as in the event of a car being derailed the bottom rod 6 of the brake will not be likely to be torn off by an obstacle on the track or a cross-over rail. The hangers 4 are pivotally connected at 7 to the brackets 3 and are pivotally connected to reduced end portions 8 on the beams 11, Figures 6, 7 and 8. The brake shoes 10 are preferably integral with the crosswise beams 11, and are opposed to the upper quarters of the wheels 12ˣ as shown for the purpose before indicated. To an arm 12 on one beam 11 is fulcrumed a floating lever 13, and to an arm 14 on the other beam 11 is fulcrumed a lever 15, the upper arm of the said lever 15 being pivotally connected at 16 to an arm 17 fixedly connected to the top bolster 18 of the truck frame. The before mentioned bottom rod 6 is interposed between and pivotally connected to the lower arms of the levers 13 and 15 and is disposed and adapted to work above the sand bolster 5 for the important purpose before mentioned. To the upper arm of the floating lever 13 is connected one end of the rod 19 through the medium of which the brake is applied and released.

In the practical operation of my improvement it will be manifest that when the brake rod 19 is moved in the direction indicated by arrow in Figure 5 the brake shoes on the beam 11 at the left hand side as shown in the drawing will be caused to contact with the adjacent wheels 12$^x$, and after contact of the brake shoes with the wheels the lower arm of the lever 13 will thrust the bottom rod 6 in a direction opposite to the said arrow with the result that the lever 15 will be thrust in the same direction as the rod with the result that the brake shoes on the other beam 11 at the right hand side in the drawing will be applied to the adjacent wheels 12$^x$, and all of the wheels will be powerfully braked. It will also be understood that on movement of the brake rod 19 in the direction opposite to that indicated by arrow in Figure 5, the brake shoes will positively and gravitationally move away from the wheels so that the brake will be absolutely released.

In addition to the practical advantages hereinbefore ascribed to my novel brake it will be readily noted that the brake is simple and inexpensive in construction, is reliable in operation, and is well adapted to withstand the rough usage to which railway brakes are ordinarily subjected.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:

In a brake construction, the combination of a truck frame including side members on which are brackets and inwardly extending shelves, and brake means carried by the said truck frame and including swinging means pivotally connected to and extending upwardly from the said brackets and carrying crosswise beams above said shelves and shoes on the beams, said shoes being arranged to be opposed to the upper inner quarters of wheels complementary to the truck frame, and means for the actuation of the said swinging means.

In testimony whereof, I affix my signature.

EMORY M. IVIE.